US010853225B2

United States Patent
Ohata

(10) Patent No.: US 10,853,225 B2
(45) Date of Patent: Dec. 1, 2020

(54) CONTROL METHOD, APPARATUS, AND NON-TRANSITORY COMPUTER-READABLE STORAGE MEDIUM FOR GENERATING DATA BODY ADJUSTED TO SECOND PROGRAM BY CONVERTING DATA TYPE OF PARAMETER OF FIRST PROGRAM

(71) Applicant: FUJITSU LIMITED, Kawasaki (JP)

(72) Inventor: Takashi Ohata, Fujinomiya (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/283,922

(22) Filed: Feb. 25, 2019

(65) Prior Publication Data

US 2019/0286550 A1    Sep. 19, 2019

(30) Foreign Application Priority Data

Mar. 16, 2018    (JP) ................. 2018-050189

(51) Int. Cl.
    *G06F 11/36*      (2006.01)
    *G06F 8/41*      (2018.01)

(52) U.S. Cl.
    CPC ............ *G06F 11/3644* (2013.01); *G06F 8/41* (2013.01); *G06F 11/3664* (2013.01)

(58) Field of Classification Search
None
See application file for complete search history.

(56) References Cited

U.S. PATENT DOCUMENTS

| 5,361,351 | A | * | 11/1994 | Lenkov | ................. | G06F 9/4488 717/124 |
| 2003/0126590 | A1 | * | 7/2003 | Burrows | ................. | G06F 8/437 717/154 |
| 2008/0059843 | A1 | * | 3/2008 | Sato | .................... | G06F 11/3636 714/45 |
| 2008/0301644 | A1 | * | 12/2008 | Drepper | ............. | G06F 9/44589 717/124 |
| 2015/0378691 | A1 | | 12/2015 | Chouhan | | |
| 2018/0189165 | A1 | * | 7/2018 | Yamada | ................. | G06F 11/28 |

FOREIGN PATENT DOCUMENTS

| JP | 5-307473 | 11/1993 |
| JP | 2017-523506 | 8/2017 |

* cited by examiner

*Primary Examiner* — Qing Chen
(74) *Attorney, Agent, or Firm* — Fujitsu Patent Center

(57) ABSTRACT

A control method includes: executing a receiving process that includes receiving designation, the designation indicating a program, a data kind and a data type; executing a identifying process that includes identifying a data type associated with the designated program and data kind by referring to a storage unit, the storage unit being configured to store information associating a data type of a target data of processing to be executed by a program with the program and a data kind of the data; executing a generating process that includes generating information associating the identified data type with the designated program and data type.

15 Claims, 16 Drawing Sheets

FIG. 3

| DEBUG INFORMATION (PARTIAL) | | |
|---|---|---|
| SYMBOL NAME | DATA CLASSIFICATION | BYTE COUNT |
| PRICE | ZoneDecimal | 9 |

| C#/VB DATA ||
|---|---|
| TYPE | VALUE |
| Int32 | 100 |

| COBOL DATA |||
|---|---|---|
| TYPE | VALUE (INTERNAL REPRESENTATION) | VALUE (EXTERNAL REPRESENTATION) |
| PIC9 (9) | [48, 48, 48, 48, 48, 48, 49, 48, 48] | 100 |

US 10,853,225 B2

CONTROL METHOD, APPARATUS, AND NON-TRANSITORY COMPUTER-READABLE STORAGE MEDIUM FOR GENERATING DATA BODY ADJUSTED TO SECOND PROGRAM BY CONVERTING DATA TYPE OF PARAMETER OF FIRST PROGRAM

CROSS-REFERENCE TO RELATED APPLICATION

This application is based upon and claims the benefit of priority of the prior Japanese Patent Application No. 2018-50189, filed on Mar. 16, 2018, the entire contents of which are incorporated herein by reference.

FIELD

The embodiments discussed herein are related to a control method, an information processing apparatus, and a non-transitory computer-readable storage medium for storing a program.

BACKGROUND

In recent years, mobile terminals have been used which use business applications written in COBOL (hereinafter, sometimes called a COBOL application). Such a COBOL application may not operate directly on a mobile terminal. A REST service running on a server may be used to indirectly execute a COBOL program from a mobile terminal.

In order to generate such a REST service, a framework for generating the REST service is used. For example, C# language or VB (Visual Basic) may be used to generate the REST service. In order for the REST service to use a COBOL program, the COBOL program operable on the framework is called from the REST service generated in C# language or VB. A technique relating to the calling has been known which changes arguments of the COBOL program to be called to have a common type to that of the framework. The data type of the framework and the data type of the COBOL program may be converted so that the converted COBOL data type may be used to use a bridge program that is a program for calling the COBOL program.

Examples of the related art include Japanese National Publication of International Patent Application No. 2017-523506 and Japanese Laid-open Patent Publication No. 05-307473.

SUMMARY

According to an aspect of the embodiments, a control method includes: executing a receiving process that includes receiving designation, the designation indicating a program, a data kind and a data type; executing a identifying process that includes identifying a data type associated with the designated program and data kind by referring to a storage unit, the storage unit being configured to store information associating a data type of a target data of processing to be executed by a program with the program and a data kind of the data; executing a generating process that includes generating information associating the identified data type with the designated program and data type.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates an example of debug information.

DESCRIPTION OF EMBODIMENTS

The aforementioned technique, however, may require a user to generate a calling program and respective data type conversion programs for execution of a program such as a COBOL program, which may not be executed directly by a mobile terminal and use a REST service instead, imposing a high workload on the user.

For example, according to the technique using a common type, a user is to add a change to the COBOL resource. However, adding a change to a program which is already running in a stable manner may impose a high risk on a user, which may further impose high secondary workloads such as validation of influences to other programs.

According to the technique using a bridge program, a change is not to be added to a COBOL resource, but there are high workloads including generation and update of the bridge program. For example, the bridge program may be a bridge program performing static type conversion or a bridge program performing dynamic type conversion. The bridge program performing static type conversion is a method which provides tools and functions for prompting a user to input information via wizards, for example, and generating source code of the bridge program including type conversion processing. The bridge program performing dynamic type conversion is a method including dynamically obtaining information upon execution of the program and converting between a data type of a non-COBOL programming language and COBOL-unique data type to provide the bridge program for dynamically calling a program as a library.

However, the bridge program performing the static type conversion may include generation of source code of the bridge program for each interface of a COBOL program to be called. Therefore, when the interface of the COBOL program is changed, the generated code is to be made over again from the first, which increases user's cost for resource management.

The bridge program performing the dynamic type conversion uses a reflection to analyze metadata of a COBOL program to be called upon execution of the program. However, it may be difficult to convert a COBOL-unique data type (unique type) by using the metadata only. Without using a reflection, conversion rules, for example, are to be defined, which may only allow simple conversions based on the definitions and is not realistic.

According to one aspect, it is an object to provide a control program, a control method and an information processing apparatus which may reduce a workload to be imposed on a user for calling and executing from one program to another program.

Embodiments of a control program, a control method and an information processing apparatus will be described in details with reference to the attached drawings. It is understood that embodiments are limited by the following embodiments. The following embodiments may be combined properly without departing from consistency.

Embodiment 1

Overall Configuration

Figure 1:
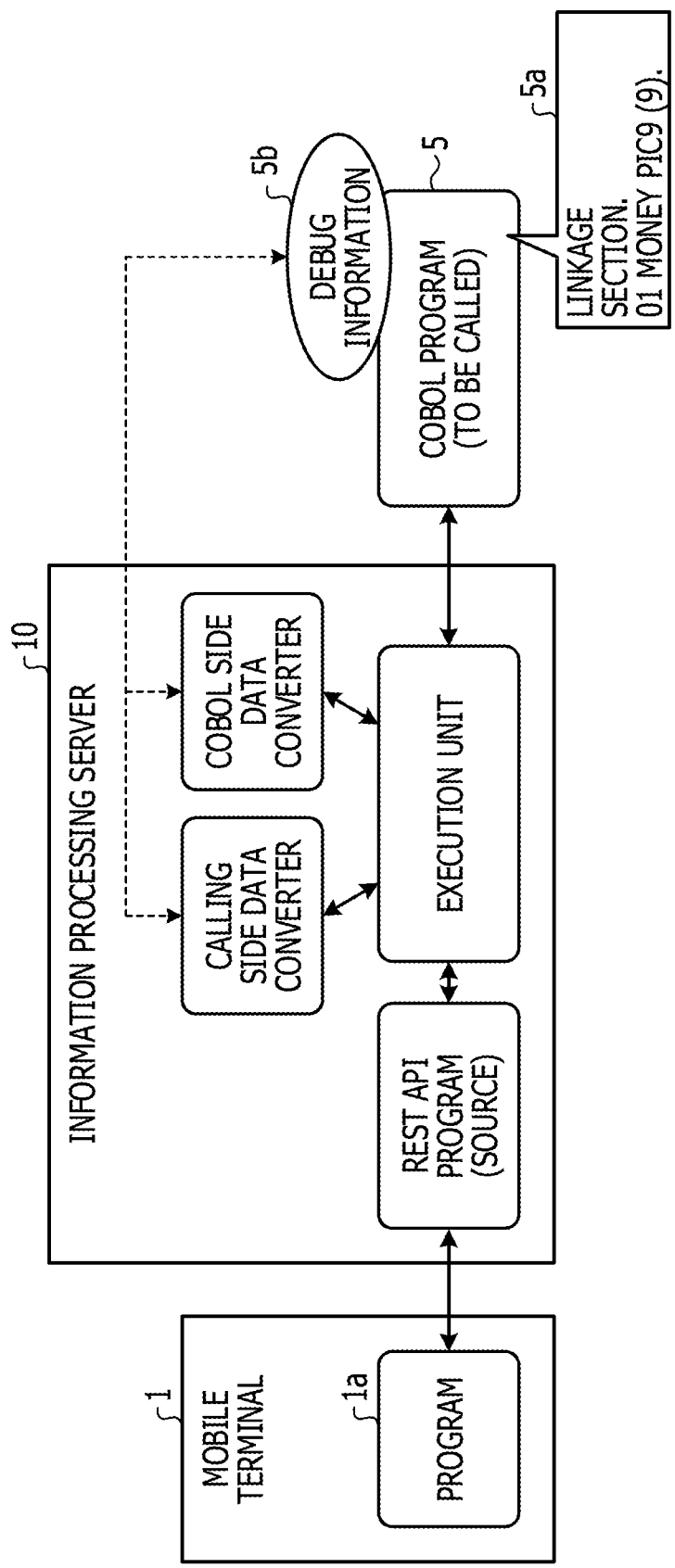
FIG. 1 illustrates an example of an entire configuration of an information processing system according to Embodiment 1.

FIG. 1 illustrates an example of an overall configuration of an information processing system according to Embodiment 1. The information processing system includes a mobile terminal 1, an information processing server 10, and a storage device configured to hold a COBOL program 5. The information processing system is configured to indirectly execute the COBOL program 5 from an application of a REST service (REST API (application programming interface) program) generated by a user, for example, in response to a request from the mobile terminal 1.

The mobile terminal 1 is a small, lightweight and portable information terminal and is an example of a communication terminal such as a smart phone and a mobile terminal. The mobile terminal 1 is configured to execute a program 1a generated by a user, for example, and indirectly execute the COBOL program 5 by using a REST service with the information processing server 10. The program 1a is a program which may be written in C# language, Java (registered trademark), Swift (registered trademark) or the like and is configured to call and execute the REST API program for calling the COBOL program 5 to be called by using HTTP (Hypertext Transfer Protocol) communication.

The COBOL program 5 is a program constructed by writing, in COBOL, a process 5a such as price calculation. The COBOL program 5 is called by the REST API program in response to a request from the program 1a in the mobile terminal 1 to execute the process 5a and responds to the program 1a with the execution result through the REST API program. When a compiler, for example, compiles the COBOL program 5, debug information 5b is output. The debug information 5b may include information such as an executable binary data structure (structure and type information), a code structure (such as functions and subroutines), local variables and arguments. The debug information 5b is output to and stored in the COBOL program 5 or an area (output destination) designated by the compiler, for example.

The information processing server 10 is an example of a server apparatus configured to provide a REST service which executes a process by the COBOL program 5 to the program 1a in the mobile terminal 1. The information processing server 10 is further configured to receive type information of a program to be called. The information processing server 10 identifies the data type of data to be processed by the program to be called with reference to the debug information of the program to be called. After that, the information processing server 10 generates information which associates the identified data type with the program to be called.

More specifically, for example, the information processing server 10 has a REST API program, an execution unit, a calling side data converter, and a COBOL side data converter. The REST API program is an application for using the COBOL program 5 from the mobile terminal 1 and is a calling source program. A REST API is an API generated based on provisions called REST, and the API enables a program (COBOL program 5 here) generated for a certain purpose to be made available to other software programs (the program 1a in the mobile terminal 1 here). The REST API program is an application configured to receive an HTTP communication, execute a logic (here, execute the COBOL program through an execution unit) and return data as a result of the processing.

The execution unit has a call function to the COBOL program 5. The execution unit is configured to execute the COBOL program 5 in response to a request from the REST API program executed in response to a request from the program 1a in the mobile terminal 1 and return the result to the REST API program. The REST API program is configured to return data to the program 1a in the mobile terminal 1 by using the result from the COBOL program 5. The calling side data converter is configured to convert the data type of the COBOL program 5 to the data type of the REST API program based on a the debug information 5b piece (such as type information) on the COBOL program 5 obtained from the debug information 5b. The COBOL side data converter is configured to convert the data type of the REST API program to the data type of the COBOL program 5 based on the debug information 5b piece (such as type information) on the COBOL program 5 obtained from the debug information 5b.

Next, a flow of the REST service according to Embodiment 1 will specifically be described, for example. First, the program 1a in the mobile terminal 1 transmits a request to the REST API application. The REST API application then designates type information (information for a reflection) for accessing the debug information and notifies the execution unit in the information processing server 10 of the designated type information. After that, the program 1a transmits to the execution unit in the information processing server 10 an argument of a data type of the REST API program to be transmitted to the COBOL program 5.

Then, the execution unit in the information processing server 10 converts the data type of the received REST API program to the data type of the COBOL program by using the COBOL side data converter and holds the result.

After that, the program 1a in the mobile terminal 1 transmits an HTTP request (request) to the REST API program in the information processing server 10, and the REST API program in response to the request executes a call function included in the execution unit for the COBOL program 5. Then, the execution unit in the information processing server 10 calls the COBOL program 5 by using the COBOL data type as its argument. As a result, the COBOL program 5 is executed.

After that, the execution unit in the information processing server 10 receives a resetting value of the data type of COBOL from the COBOL program 5. Next, the execution unit in the information processing server 10 converts the resetting value having the data type of the COBOL program 5 to the data type of the REST API program by using the calling side data converter. Then, the execution unit in the information processing server 10 returns the resetting value having the converted data type of the REST API program to the REST API program. After that, the type converted resetting value is returned from the REST API program to the program 1a in the mobile terminal 1.

Thus, the information processing server 10 calls and executes the COBOL program 5 in response to a request from the mobile terminal 1, obtains the execution result, and responds to the mobile terminal 1 with the execution result. Therefore, even when the type of an argument in the COBOL program 5 is changed, the range of possible values of the COBOL program 5 to be called may be dynamically obtained upon execution, and the type conversion may be performed based on the range. When the argument has a value within the range of possible values, no change is to be added to the REST API program and the program 1a. As a result, the workload may be reduced which is to be imposed on a user for calling and executing from one program to another program.

Functional Configurations

Next, functional configurations of the apparatuses illustrated in FIG. 1 will be described. Because the mobile terminal 1 has the same configuration as that of a standard smart phone, for example, the information processing server 10 will be described below.

Figure 2:
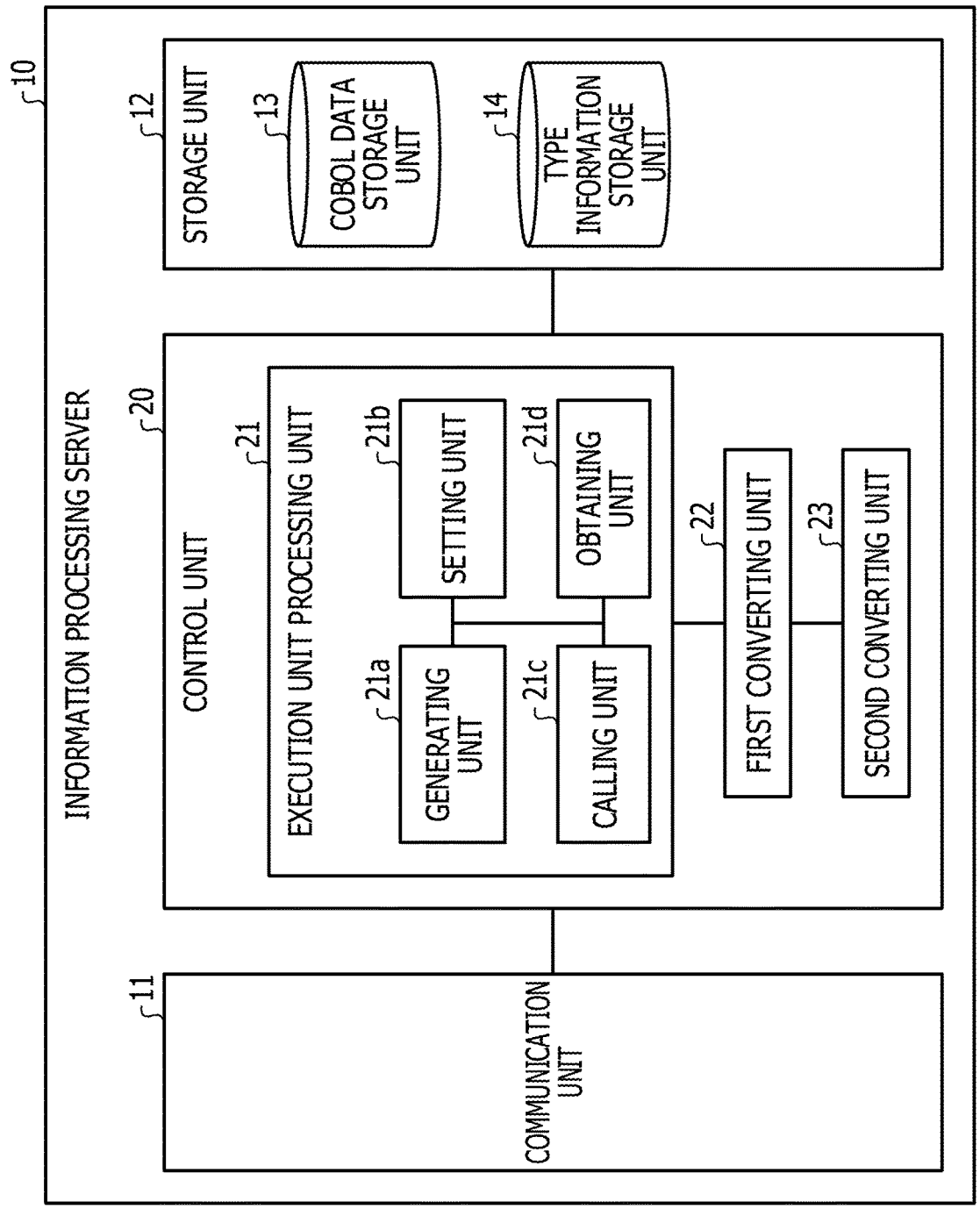
FIG. 2 is a functional block diagram illustrating a functional configuration of an information processing server according to Embodiment 1.

FIG. 2 is a functional block diagram illustrating a functional configuration of the information processing server 10 according to Embodiment 1. Referring to FIG. 2, the information processing server 10 includes a communication unit 11, a storage unit 12, and a control unit 20.

The communication unit 11 is a processing unit configured to control wired and wireless communication with other apparatuses and corresponds to the REST API program generated by a user, for example. The communication unit 11 is further configured to execute transmission and reception of information to and from the mobile terminal 1 and transmission and reception of information to and from the COBOL program 5.

The storage unit 12 is an example of a storage device configured to store data and a program and may be a memory or a hard disk, for example. The storage unit 12 has a COBOL data storage unit 13 and a type information storage unit 14.

The COBOL data storage unit 13 is configured to store an argument (or argument data) to be passed to the COBOL program 5. The type information storage unit 14 is configured to store type information on the COBOL program 5. These storage units may be examples of parts of a storage area in a memory, for example.

The control unit 20 is a processing unit responsible for the entire information processing server 10 and may be a processor, for example. The control unit 20 has an execution unit processing unit 21, a first converting unit 22, and a second converting unit 23. The execution unit processing unit 21, the first converting unit 22, and the second converting unit 23 may be examples of processes executed by the processor. The execution unit processing unit 21 corresponds to the execution unit illustrated in FIG. 1, the first converting unit 22 corresponds to the COBOL side data converter illustrated in FIG. 1, and the second converting unit 23 corresponds to the calling side data converter illustrated in FIG. 1.

The execution unit processing unit 21 is a processing unit which implements the execution unit configured to perform calling of the COBOL program 5 and data conversion and has a generating unit 21a, a setting unit 21b, a calling unit 21c, and an obtaining unit 21d.

The generating unit 21a is a processing unit configured to generate an execution unit for executing a designated COBOL program or executing settings of the execution unit. More specifically, because the generating unit 21a uses type information to use a reflection function in the program 1a, type information of the COBOL program 5 to be called is designated for generating a process by, for example, the execution unit. For example, the generating unit 21a determines whether the type information received from the REST API program is the type information of the COBOL program 5 or not. If the type information is the type information of the COBOL program 5, the generating unit 21a sets the type information in the program in the execution unit. On the other hand, if the type information is not the type information of the COBOL program 5, the generating unit 21a outputs an error upon execution.

The setting unit 21b is a processing unit configured to set, in the execution unit, argument data to be passed to the COBOL program 5. The setting unit 21b handles a symbol name of a target argument and the data type of the REST API program as arguments, converts the data type of the REST API program to the data type of the COBOL program within its processing, and causes the execution unit to hold the result.

For example, when the setting unit 21b receives the argument data from the REST API program, the setting unit 21b stores the argument data in the COBOL data storage unit 13. The setting unit 21b then obtains debug information of the COBOL program 5 and requests the first converting unit 22 (COBOL side data converter) to perform data type conversion processing by using the debug information. After that, the setting unit 21b sets the COBOL data in a dynamic typing variable included in the execution unit.

Next, an example of the debug information 5b of the COBOL program 5 will be described. FIG. 3 illustrates an example of the debug information. FIG. 3 illustrates a concrete example for calling a COBOL program for calculating a tax-included price. The program has one argument whose name is "price" and is a 9-digit unsigned numerical value (PIC9(9)). As illustrated in FIG. 3, the debug information 5b of the COBOL program 5 includes a symbol name and a classification and a byte count of data. The symbol name and the kind of the argument data type are information designating numbers in a format of "number/characters/specific data", and the byte count represents the byte count of the argument data. Referring to the example in FIG. 3, the symbol name is "price", the data classification is "Zone-Decimal" and the byte count is "9".

The calling unit 21c is a processing unit configured to call the COBOL program 5 designated in the execution unit by the generating unit 21a by using the argument data set by the setting unit 21b. The calling unit 21c executes mapping between the argument for the COBOL program 5 to be called and the argument included in the execution unit by using the argument name and type information included in debug information. The calling unit 21c designates the data type of a return value for calling (data type of the REST API program) in order to obtain the return value from the COBOL program 5. When the data type is designated, the return value from the COBOL program 5 is converted to the designated data type.

The obtaining unit 21*d* is a processing unit configured to obtain the data type of the COBOL program having an argument held in the execution unit by using the data type of the REST API program. More specifically, for example, the obtaining unit 21*d*, for obtaining the data type of a COBOL program, designates the symbol name of an argument to be obtained and the data type of the REST API program which receives the argument. For example, when the obtaining unit 21*d* receives designation of a symbol name and a receiving type, the obtaining unit 21*d* requests type conversion processing on the data using the debug information to the second converting unit 23 (calling side data converter). After that, the obtaining unit 21*d* obtains the value converted to the data type of the REST API program from the second converting unit 23 and responds to the program 1*a* with the obtained value.

The first converting unit 22 is a processing unit configured to convert the data type of the REST API program to the data type of the COBOL program 5 by using the debug information 5*b*. The second converting unit 23 is a processing unit configured to convert the data type of the COBOL program 5 to the data type of the REST API program by using the debug information 5*b* and the type information on the REST API program having the conversion destination data type.

Figure 4:
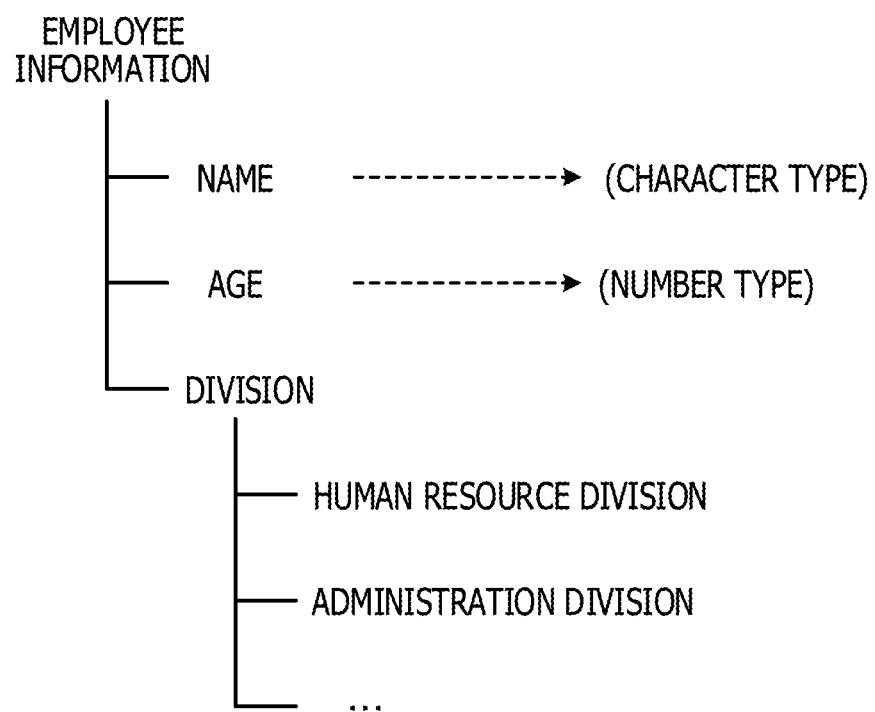
FIG. 4 illustrates group items.

Each of these converting units may execute the data type conversion on structures such as group items. FIG. 4 illustrates group items. As illustrated in FIG. 4, data as a whole has employee information each including a name and an age of an employee and a division to which the employee belongs. The division may have a human resource division and administration division. Also in this case, the first converting unit 22, for example, converts from the data type of the REST API program to the data type of the COBOL program 5 by using the debug information with respect to not only the name and age of an employee and the division to which the employee belongs but also the human resource division or administration division that are child elements.

Figure 5:
FIG. 5 illustrates an example of data conversion to a COBOL type.

Next, the data conversion to the data type of a COBOL program will be described. FIG. 5 illustrates an example of data conversion to a COBOL type. As illustrated in FIG. 5, a data type conversion using debug information by the first converting unit 22 results in a value "100" of "Int 32" type of the REST API program, and a value [48,48,48,48,48,48, 49,48,48] that is an internal representation and a value [100] that is an external representation of a "PIC9(9)" type in the COBOL program 5. COBOL has an internal representation (byte array) and an external representation. With identical number of an external representation, the internal representation or the byte count may vary in accordance with the type.

Flow of Processing

Next, a flow of processing to be executed by the information processing server 10 will be described. A flow of overall processing, and flows of processes to be executed by the processing units will be described.

Overall Processing

Figure 6:
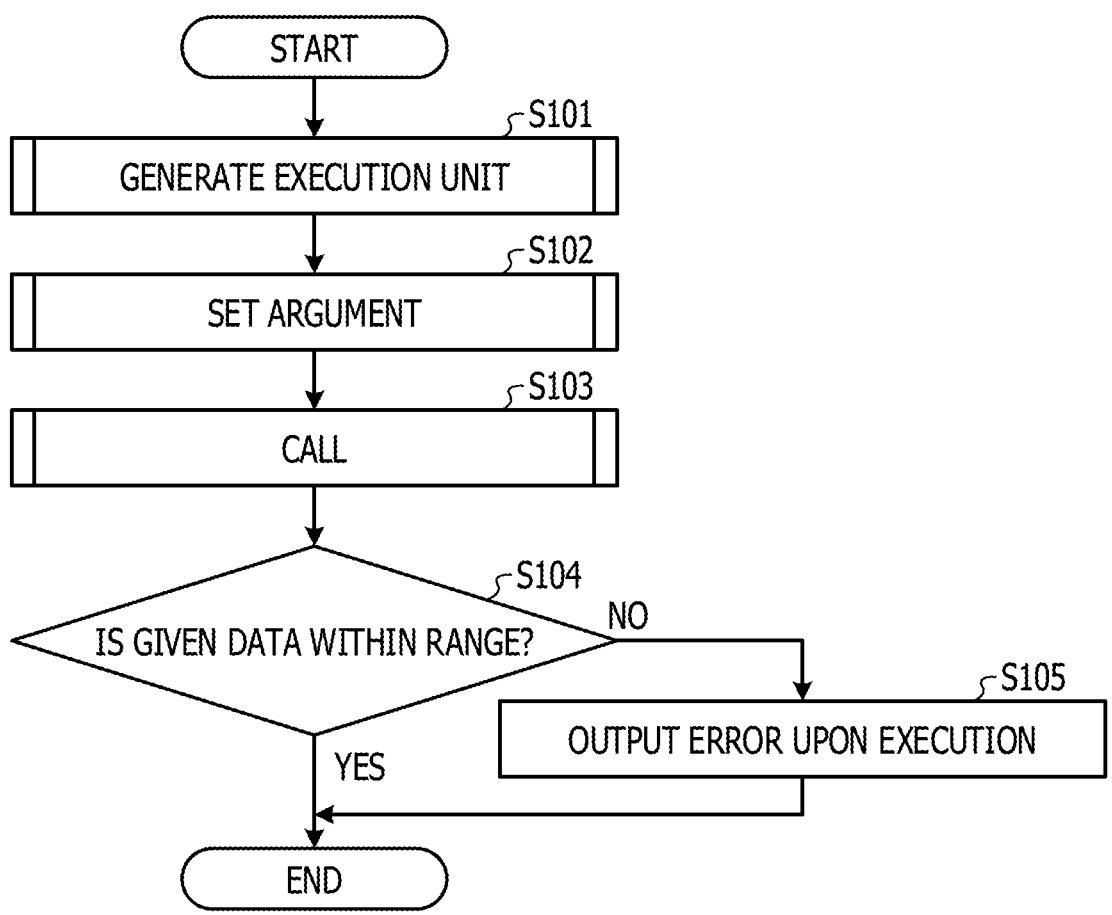
FIG. 6 is a flowchart illustrating an overall flow of processing.

FIG. 6 is a flowchart illustrating a flow of overall processing. Referring to FIG. 6, the information processing server 10 executes a process for generating an execution unit (S101), executes a process for setting an argument (S102), and executes a process for calling the COBOL program 5 (S103).

After that, if given data are within a range (S104: Yes), the processing ends. If the given data is not within the range (S104: No), an error upon execution is output (S105).

Process for Setting Argument

Figure 7:
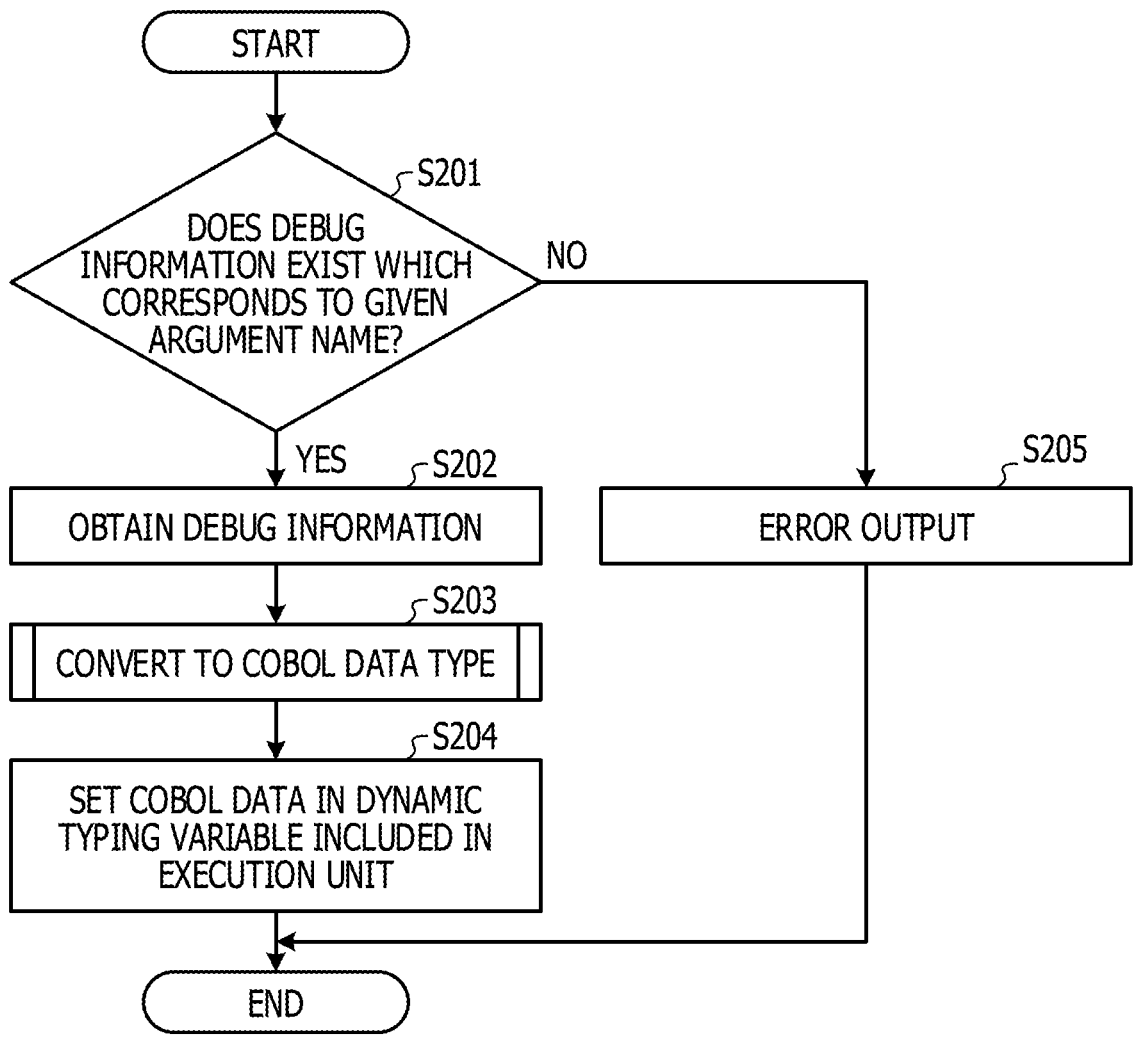
FIG. 7 is a flowchart illustrating a flow of processing for setting an argument.

FIG. 7 is a flowchart illustrating a flow of a process for setting an argument. This process corresponds to the processing in S102 in FIG. 6 and sets, in an execution unit, an argument of a data type to be passed to the COBOL program 5 to be called. Referring to FIG. 7, when the setting unit 21*b* receives information regarding argument data from the program 1*a* in the mobile terminal 1, the setting unit 21*b* determines whether debug information exists which corresponds to the given argument name or not (S201).

Then, if debug information exists which corresponds to the given argument name (S201: Yes), the setting unit 21*b* obtains the debug information of the COBOL program 5 (S202). Next, in response to a request from the setting unit 21*b*, a process for conversion to the data type of the COBOL program 5 is executed (S203). After that, the setting unit 21*b* sets data of the COBOL program in a dynamic typing variable included in the execution unit (S204). On the other hand, if no debug information exists which corresponds to the given argument name (S201: No), the setting unit 21*b* outputs an error (S205).

Calling Process

Figure 8:
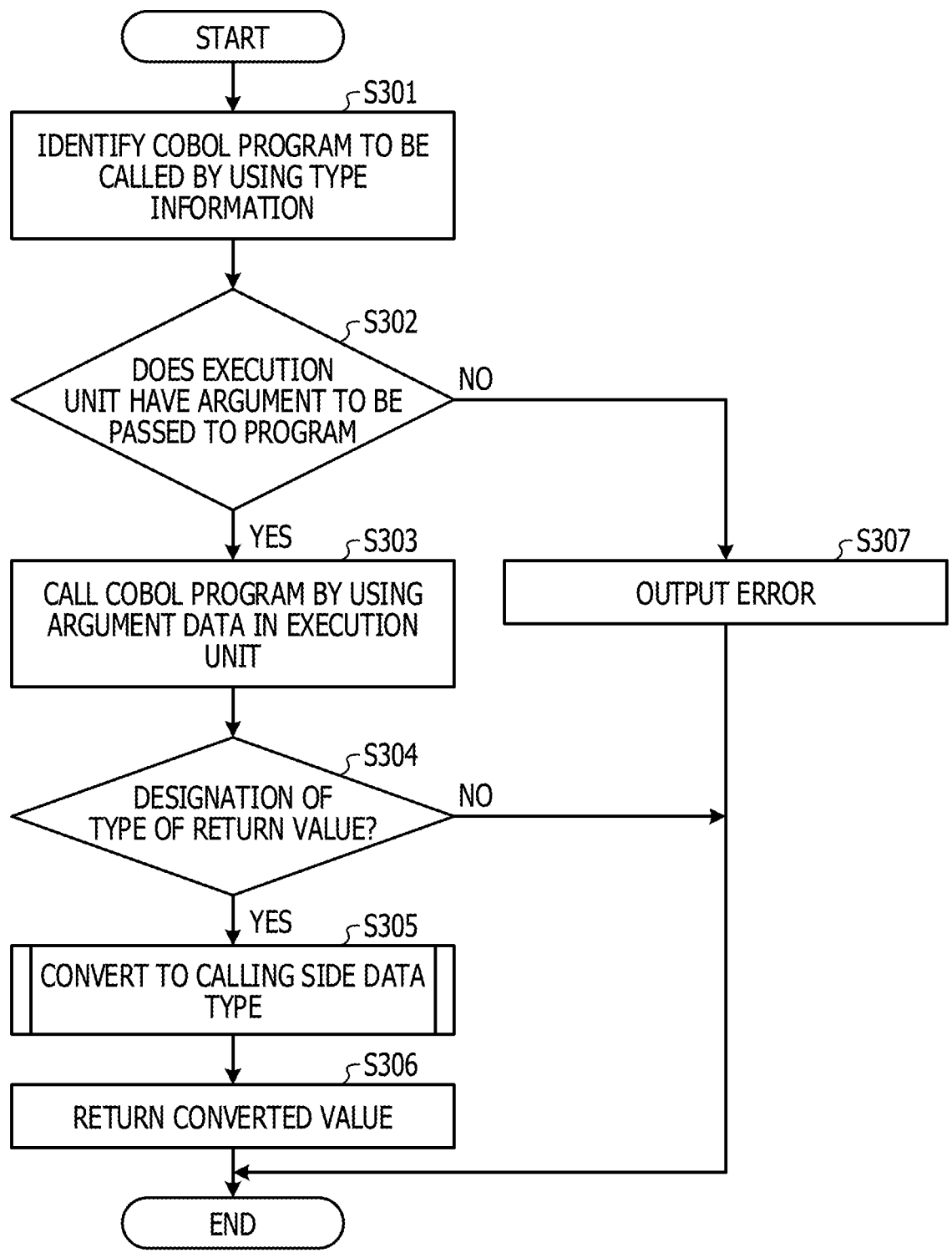
FIG. 8 is a flowchart illustrating a flow of calling processing.

FIG. 8 is a flowchart illustrating a flow of a calling process. This process is processing corresponding to S103 in FIG. 6. Referring to FIG. 8, when the calling unit 21*c* receives designation of the type of a return value, the calling unit 21*c* uses the type information to identify the COBOL program 5 to be called (S301).

Subsequently, the calling unit 21*c* refers to the debug information or metadata of the COBOL program 5 and determines whether the execution unit has an argument to be passed to the COBOL program 5 or not (S302).

If the execution unit has the argument (S302: Yes), the calling unit 21*c* uses the argument data in the execution unit to call the COBOL program 5 (S303). After that, the calling unit 21*c* determines whether the type of a return value has been designated or not (S304).

If the type of a return value has been designated (S304: Yes), processing for conversion to the data type of the calling side (source) is executed (S305). After that, the calling unit 21*c* returns a value of the type converted in S305 to the program 1*a* (S306).

On the other hand, if the type of a return value has not been designated (S304: No), the calling unit 21*c* ends the process. If the execution unit does not have the argument in S302 (S302: No), the calling unit 21*c* outputs an error (S307) and ends the process.

Process for Converting to COBOL Data Type

Figure 9:
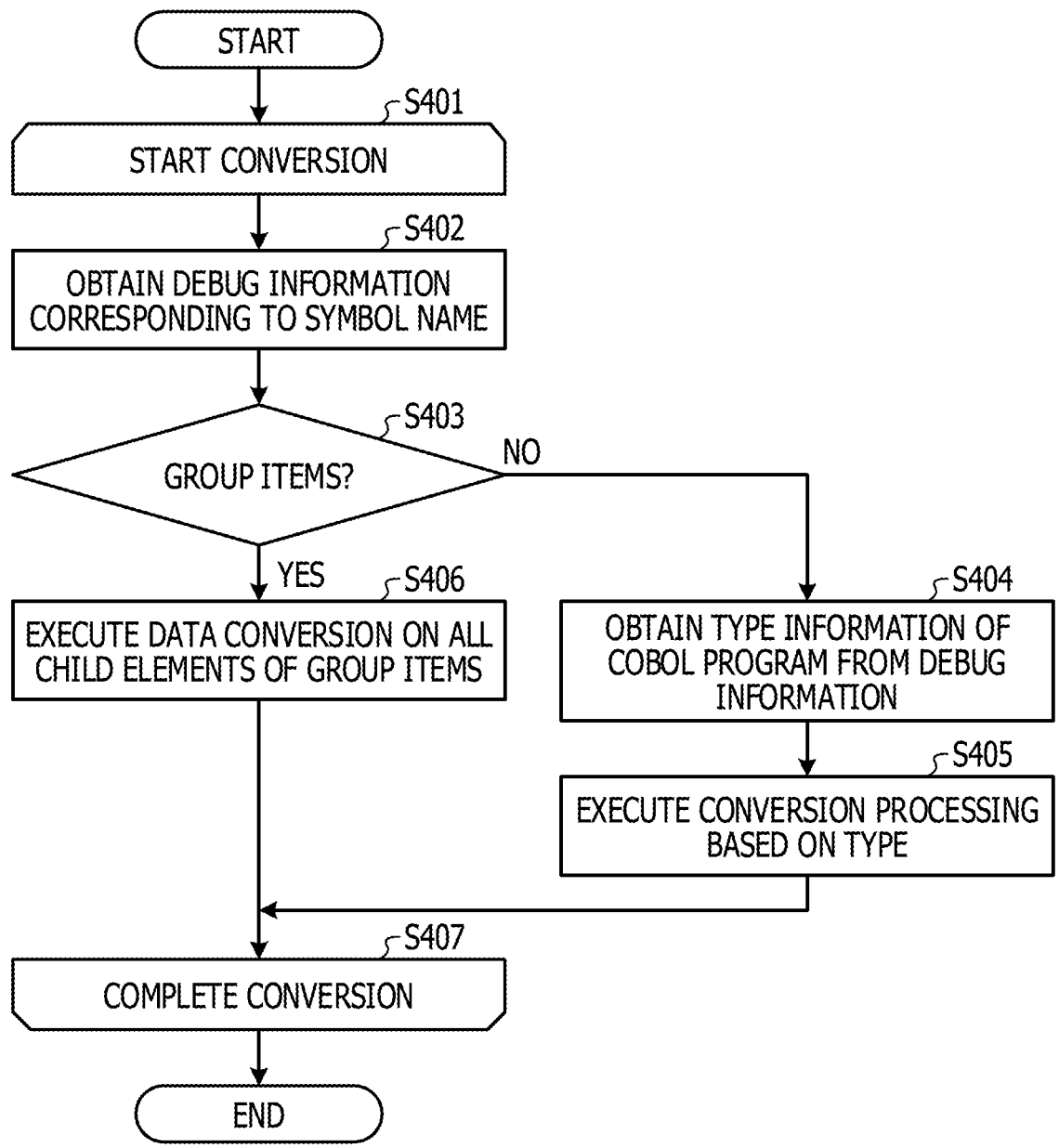
FIG. 9 is a flowchart illustrating a flow of processing for converting to a COBOL data type.

FIG. 9 is a flowchart illustrating a flow of a process for converting to a COBOL data type. This process corresponds to the processing in S203 in FIG. 7 and changes the data type of the calling source REST API program to the callee COBOL data type. Referring to FIG. 9, the first converting unit 22 executes the loop processing from S401 to S407 on data included in the debug information.

More specifically, for example, the first converting unit 22 obtains the debug information corresponding to the symbol name (S402). If the obtained debug information does not correspond to a group item (S403: No), the first converting unit 22 obtains the type information of the COBOL program from the debug information (S404) and executes a conversion process based on the type (S405).

On the other hand, if the obtained debug information is information corresponding to a group item (S403: Yes), the first converting unit 22 executes data conversion which converts data types of all child elements of the group item to the data type of the COBOL program 5 (S406).

Process for Conversion to Data Type of Calling Side

Figure 10:
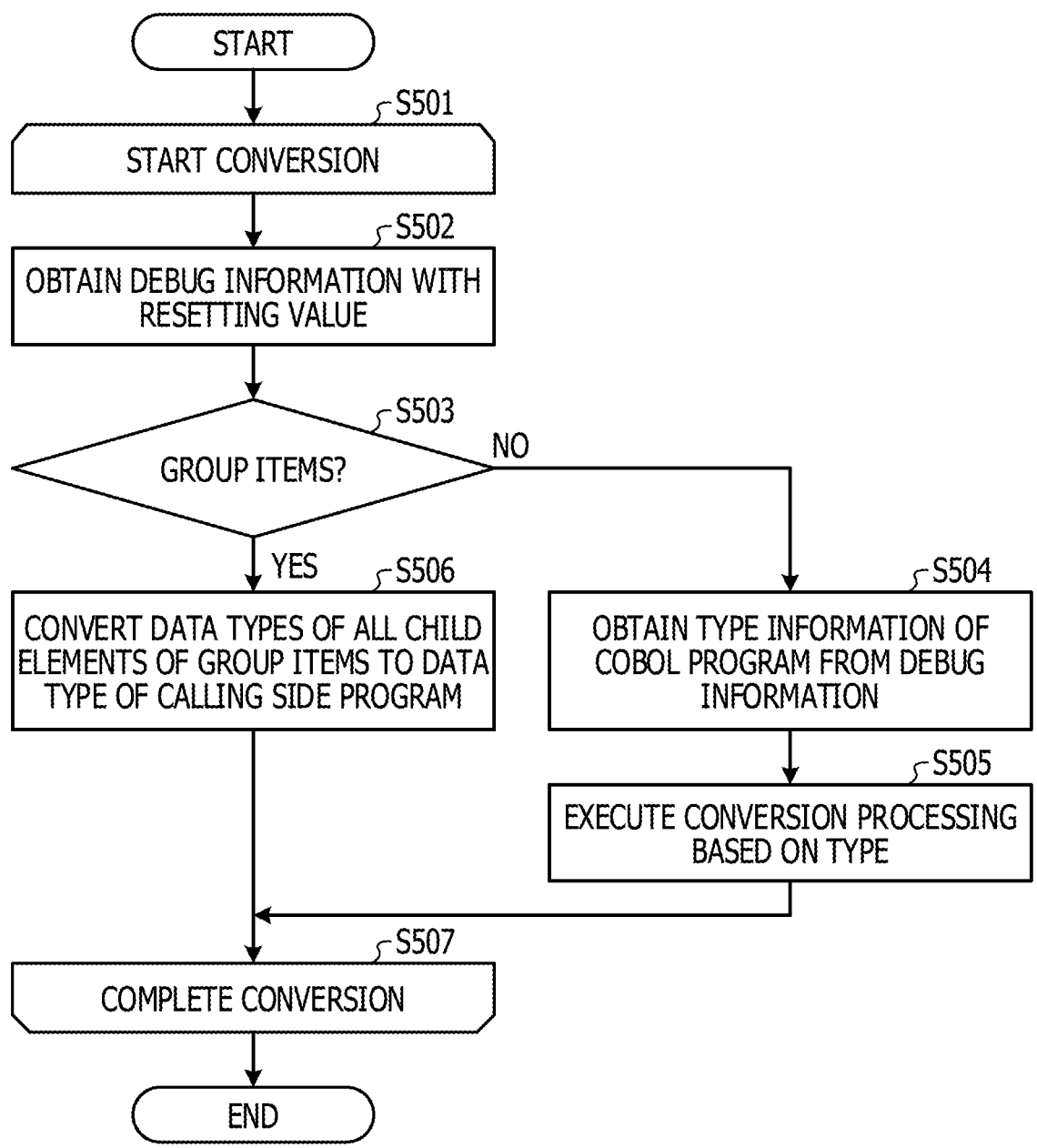
FIG. 10 is a flowchart illustrating a flow of processing for converting to a calling side data type.

FIG. 10 is a flowchart illustrating a flow of a process for converting to the data type of the calling side, which corresponds to a change of the data type of the COBOL program to the data type of the REST API program. This process corresponds to the processing in S305 in FIG. 8. Referring to FIG. 10, the second converting unit 23 executes the loop processing from S501 to S507 on data included in the debug information.

More specifically, for example, the second converting unit 23 obtains debug information with a resetting value (S502). If the obtained debug information does not correspond to a group item (S503: No), the second converting unit 23 obtains the type information of the COBOL program from the debug information (S504). Next, the second converting unit 23 executes a conversion process for converting from the COBOL type to the type of the REST API program in accordance with the type information of the return value from the REST API program (S505).

On the other hand, the obtained debug information corresponds to a group item (S503: Yes), the second converting unit 23 converts all data types of child elements of the group item to the data type of the REST API program based on the type information of the return value from the REST API program (S506).

Effects

The information processing server 10 as described above executes an execution unit configured to execute the COBOL program 5 in response to a request for calling the COBOL program 5 from the program 1a generated in a language other than COBOL. The execution unit performs type conversion between the data type of the non-COBOL language and the data type of the callee COBOL program 5 based on the debug information on the COBOL program 5 to be called. As a result, the COBOL program 5 may be called from the mobile terminal 1 without using the bridge program. Furthermore, the source code of the calling source may not be changed even when the interface of the COBOL program 5 is changed, which allows dynamic calling of the COBOL program 5 from the program 1a generated in a non-COBOL language.

Figure 11:
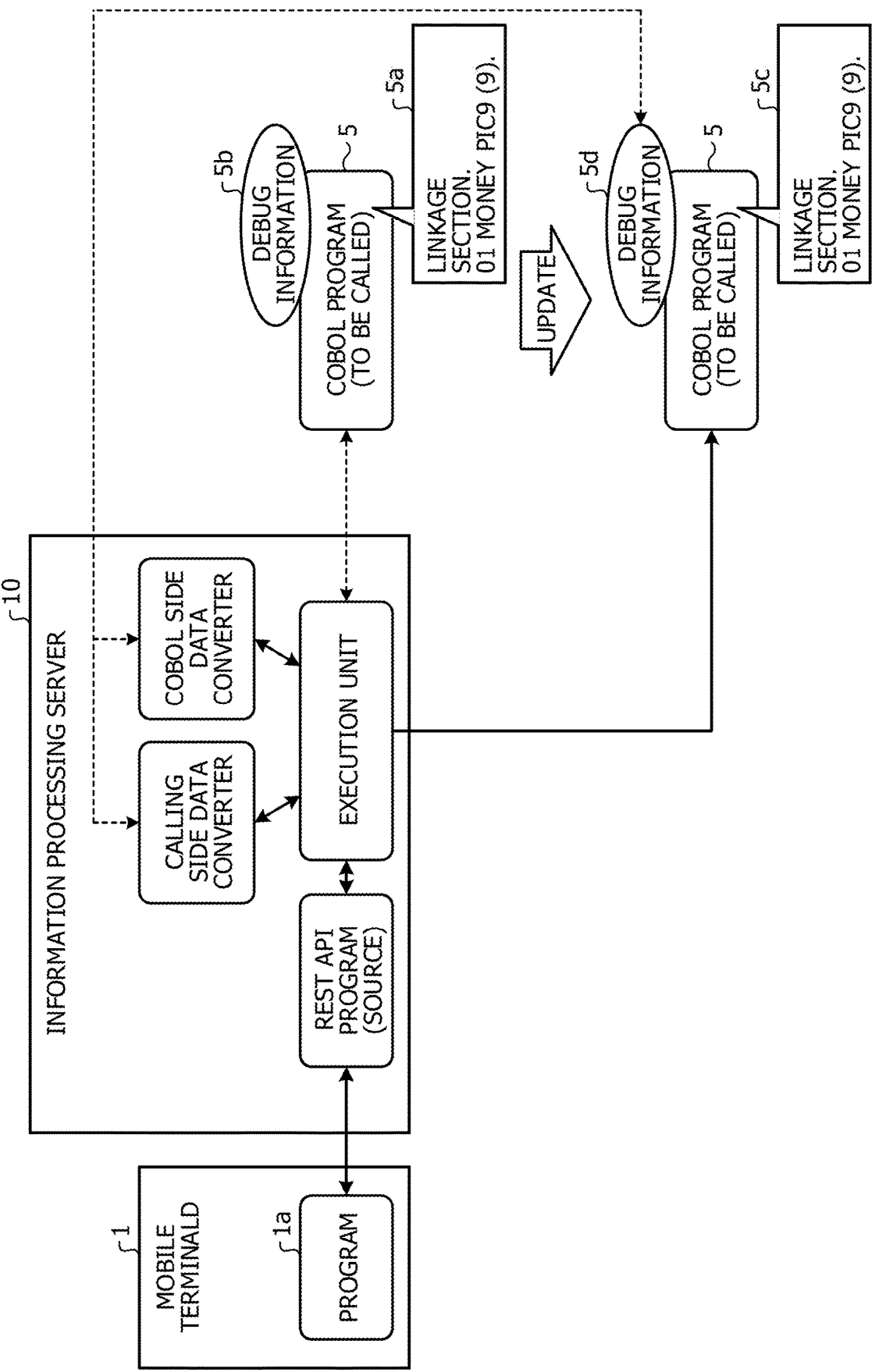
FIG. 11 illustrates effects.

FIG. 11 illustrates the effects. Referring to FIG. 11, the converters of the COBOL side data converter and calling side data converter in the information processing server 10 use the debug information 5b on the COBOL program 5 to execute the type conversion on data. After that, when the source code 5a of the COBOL program 5 is changed to the source code 5c, the converters obtain the corrected debug information 5d instead of the debug information 5b of the program before corrected so that the data type conversion may be executed. As a result, even when the callee program is changed, the data type conversion may be executed without correcting the source code of the calling source REST API program.

The information processing server 10 generates a dynamic calling program so that the time and labor of a user may be saved for managing the source code. Even when the COBOL program 5 is changed, the information processing server 10 may call the COBOL program 5 without changing the calling side program 1a and the REST API program when the value of the argument type of the calling side REST API program of the COBOL program 5 and the value of the COBOL data type are compatible. A user may not define a temporary variable for describing processing for calling the COBOL program 5 in coding, which may simplify the description of the COBOL calling processing.

Embodiment 2

Figure 12:
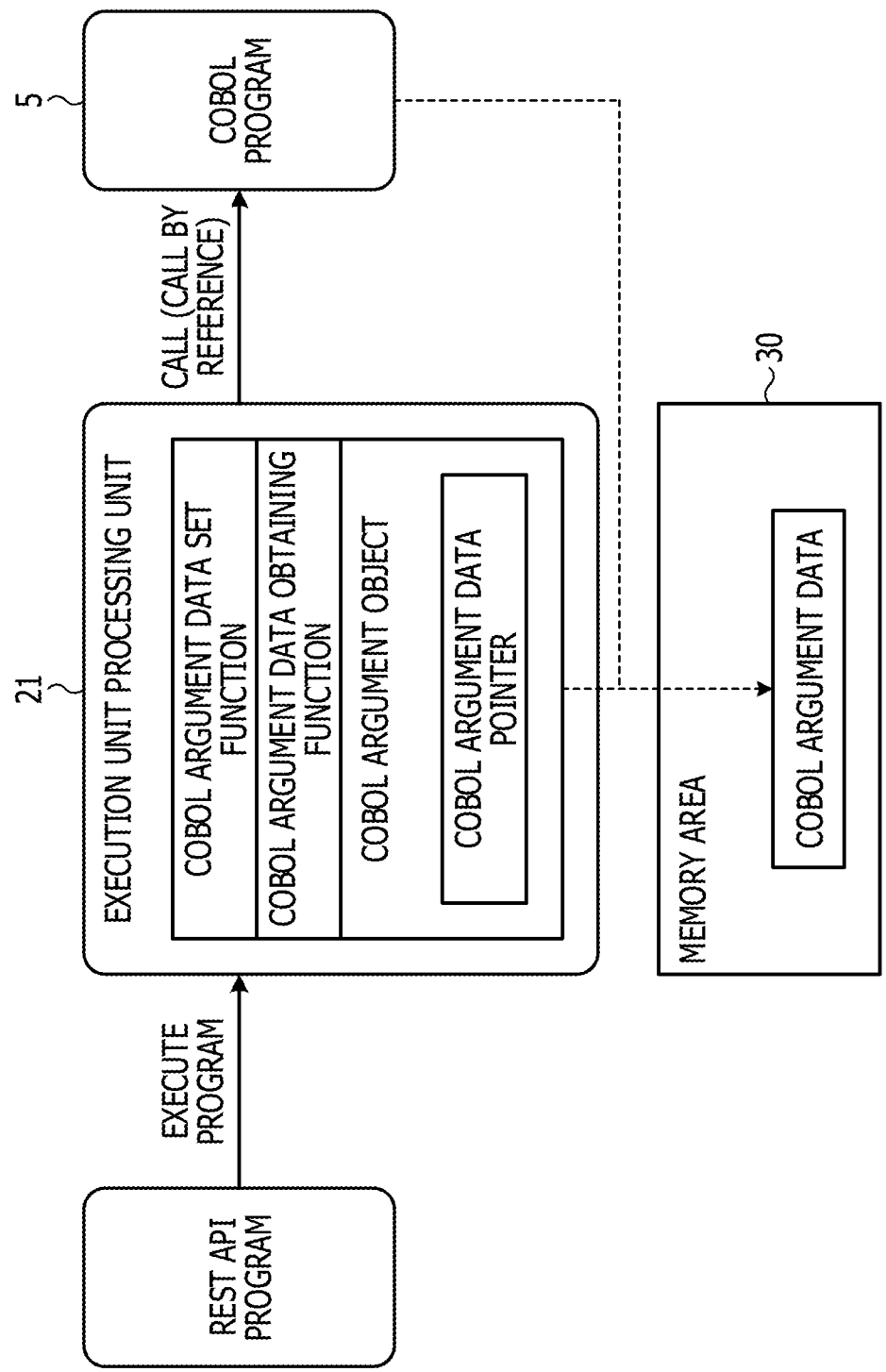
FIG. 12 illustrates an information processing server according to Embodiment 2.

The information processing server 10 may have a reference variable for an argument to be passed from an execution unit to the COBOL program 5 so that a plurality of execution units may share identical data. FIG. 12 illustrates the information processing server 10 according to Embodiment 2.

Referring to FIG. 12, the execution unit processing unit 21 has a COBOL argument data set function, a COBOL argument data obtaining function, and a COBOL argument object. These functions and object may be executed as functional units included in the execution unit processing unit 21 and may be described as examples of processes to be executed by a processor. They are executed by the execution unit processing unit 21 here, for example, but may be executed by an execution unit that is an example of a process to be executed by the execution unit processing unit 21.

The execution unit processing unit 21 may have a reference variable for an argument to be passed to the COBOL program 5 so that a plurality of execution units may share identical data. A value of an argument is passed to the COBOL program 5 by using the COBOL argument data set function. The COBOL argument data set function sets, in an argument, an argument name of the COBOL program 5 and data of another programming language corresponding thereto.

The COBOL argument data obtaining function is a function configured to convert COBOL argument data to be referred by the execution unit processing unit to a data type of a designated another programming language. The COBOL argument object is an object having a COBOL argument data pointer as a field. The field has an argument name of the COBOL program 5 corresponding to argument data as its field name. The COBOL argument data pointer is a variable having a reference to COBOL argument data.

Figure 13:
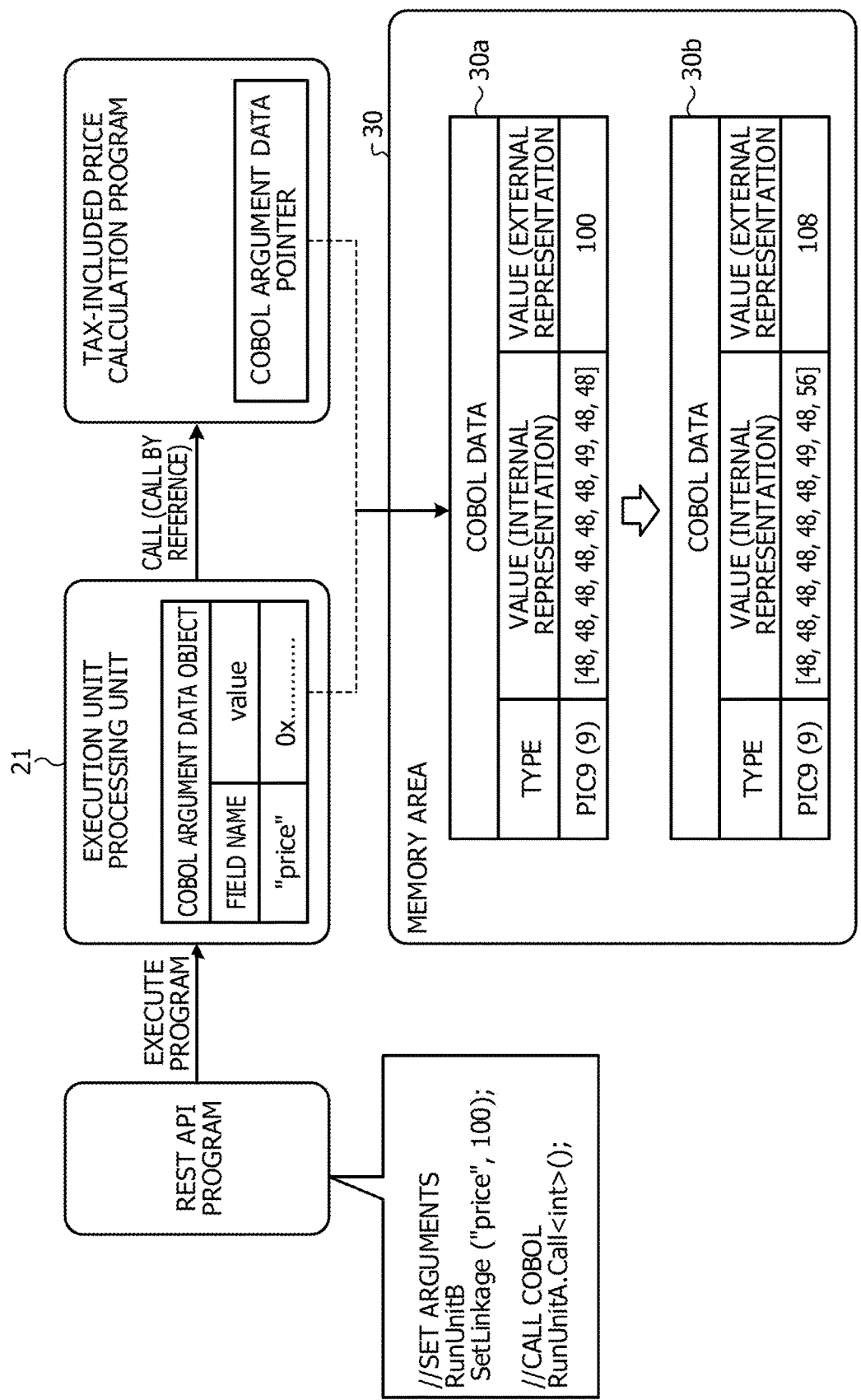
FIG. 13 illustrates an example of a change of data held in an execution unit.

The execution unit processing unit 21 as described above calls the COBOL program 5 by "call by reference" by using COBOL argument data stored in the memory area 30 that may be referred in shared manner. The COBOL program 5 stores the processing result in the memory area 30. A concrete example thereof will be described with reference to FIG. 13. FIG. 13 illustrates a variation example of data held in the execution unit. FIG. 13 illustrates an example in which a COBOL calculation program for calculating a tax-included price is called from the program 1a in the mobile terminal 1.

Referring to FIG. 13, like Embodiment 1, the execution unit processing unit 21 in the information processing server 10 uses the debug information for the tax-included price calculation program to convert between the data type of the calling side REST API program of REST API programs and the data type of the tax-included price calculation program written in COBOL.

With the execution of the REST API program by the program 1a, the execution unit processing unit 21 in the information processing server 10 calls the tax-included price calculation program by using a reference variable for the data 30a within the memory area as an argument. The tax-included price calculation program calculates a tax-included price with the argument and changes the data 30a within the memory area to data 30b. After that, the execution unit processing unit 21 in the information processing server 10 converts the data 30b within the memory area to the data type of the REST API program and transmits the result to the program 1a in the mobile terminal 1. Thus, the processing result of the tax-included price calculation program may be shared by a plurality of programs and execution units.

Figure 14:
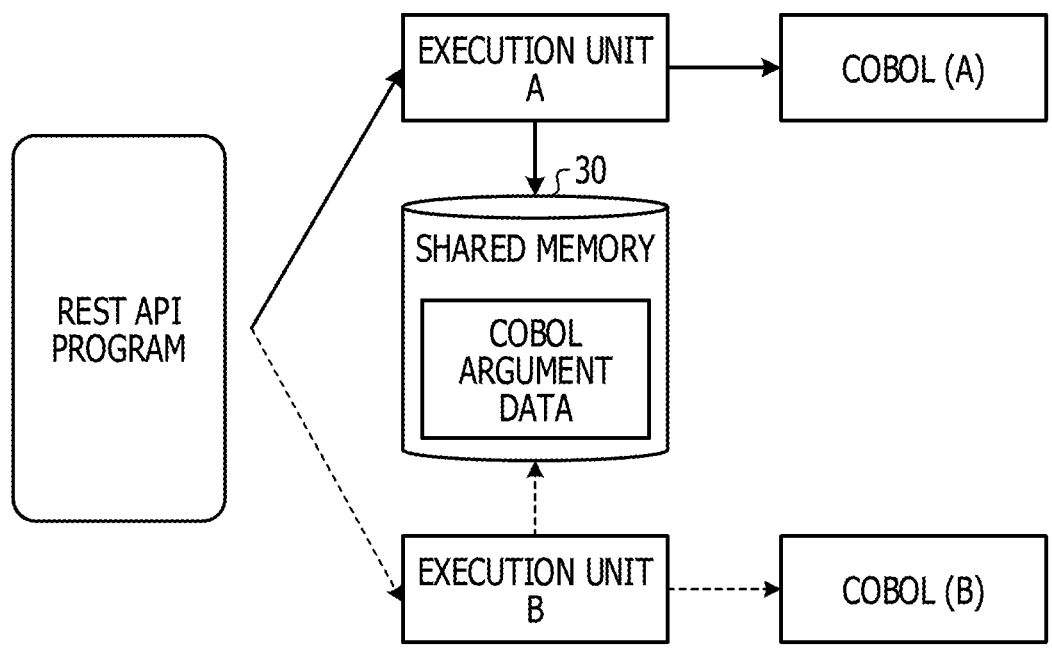
FIG. 14 illustrates reduction of a processing load by data sharing.

The data sharing will be described. FIG. 14 illustrates reduction of a processing load because of data sharing. Referring to FIG. 14, in response to a request from the program 1a, the REST API program calls COBOL (A) through the execution unit A and calls COBOL (B) through the execution unit B, for example. Here, the execution unit corresponds to the information processing server 10, and the COBOL programs have identical data as their arguments. The data types are converted by using debug information of the COBOL programs, like Embodiment 1.

According to a method of Embodiment 2, the execution unit A converts the data type of the REST API program to the COBOL data type in order to call a COBOL (A) and stores the conversion result within the shared memory 30. After that, in response to a request from the REST API program, the COBOL (A) is called by "call by reference" (reference variable) of COBOL argument data within the shared memory 30. Then, the COBOL (A) changes the data within the shared memory 30 by executing the corresponding processing. Then, the execution unit A converts the processing result (COBOL data type) stored within the shared memory 30 to the data type of the REST API program and responds with the result.

After that, when the REST API program causes the execution unit B to call the COBOL (B), the execution unit B may obtain the processing result from the execution unit A having executed the same processing. For example, the execution unit B may read the data within the shared memory 30 written by the execution unit A or the COBOL (A). The execution unit B responds to the REST API program with the read data. In this case, when the read data has the COBOL data type, the execution unit B converts it to the data type of the REST API program and responds with the converted data type. When the read data has already been converted to the data type of the REST API program by the execution unit A, the data may be returned as it is. In this manner, the execution unit B may not perform the processing for conversion between the data type of the REST API program and the COBOL data type. As a result, the source code may be simplified within the program 1a.

Figure 15:
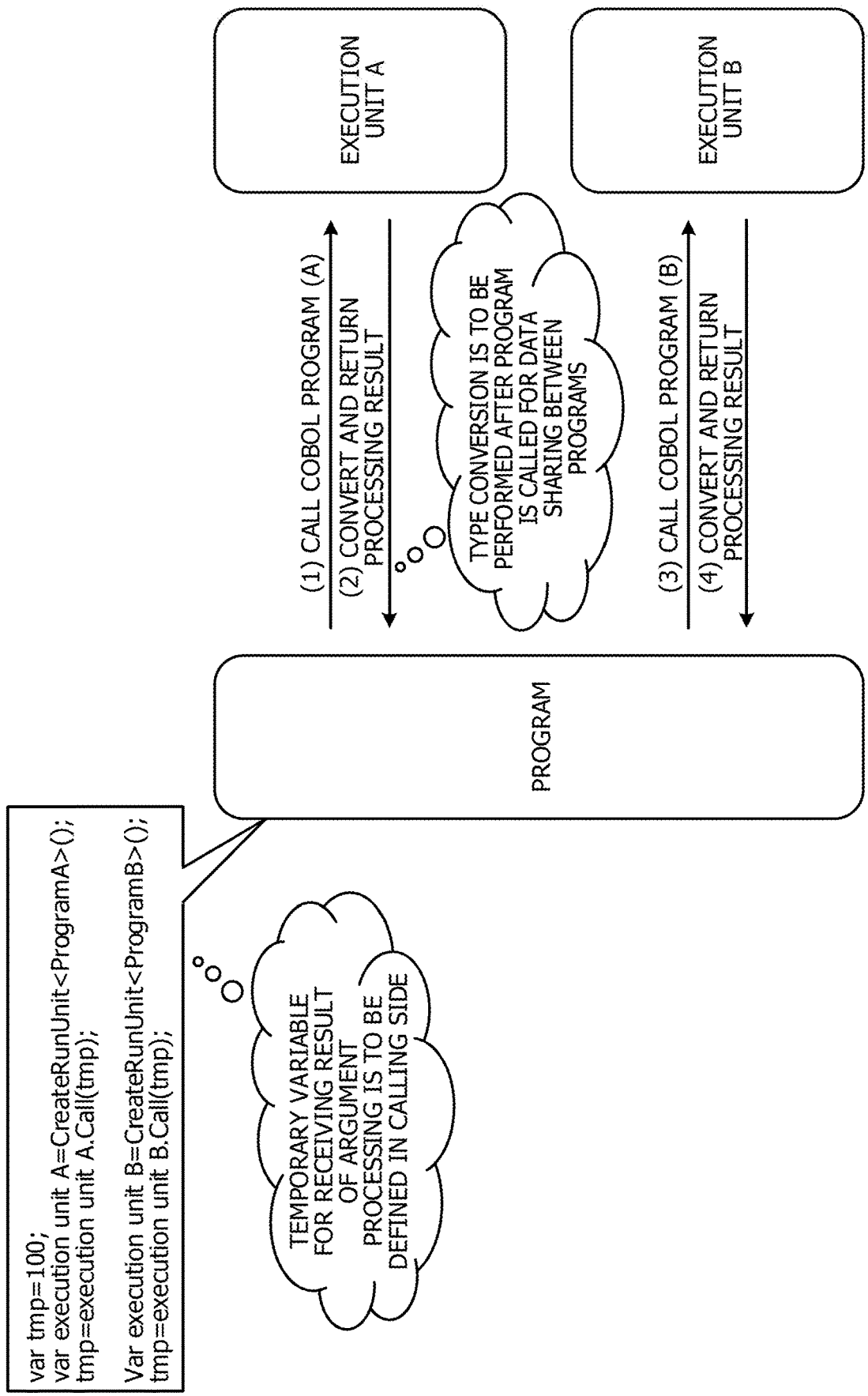
FIG. 15 illustrates an increase of a processing load because of a bridge program.

On the other hand, a method using a standard bridge program may impose a high processing load. FIG. 15 illustrates an increased processing load due to a bridge program. FIG. 15 also assumes an example in which the program 1a calls the COBOL (A) through the execution unit A and calls the COBOL (B) through the execution unit B, like FIG. 14.

In the case in FIG. 15, the REST API program transmits a request for calling the COBOL program (A) through the execution unit A. The execution unit A calls the COBOL program (A) after the type conversion is performed, and the type conversion is then performed on the value obtained from the COBOL program (A), the result of which is transmitted to the program 1a.

After that, the REST API program transmits a request for calling the COBOL program (B) through the execution unit B. The execution unit B, like the execution unit A, calls the COBOL program (B) after performing the type conversion and then performs type conversion on the value obtained from the COBOL program (B), whose result is transmitted to the REST API program.

In this manner, in a case where a COBOL program causing the REST API program to perform the same processing is executed by different execution units in response to a request from a mobile terminal, for example, a temporary variable is to be defined in the calling side for receiving a result of processing with arguments. After the COBOL programs are called, the same type conversion is to be executed. Therefore, a method using a standard bridge program has an increased number of processes, which may impose a high processing load.

As described above, when values of data of COBOL programs are shared between execution units, the execution units perform conversion between the data type of a non-COBOL language and the data type of the callee COBOL program based on the debug information of the COBOL program to be called. The execution unit holds a reference to real data of an argument to be passed to the converted COBOL program. As a result, when values of data of a COBOL program are shared between execution units, a temporary variable may not be defined, and conversion to the data type of a non-COBOL programming language may not be performed.

A user may not convert an argument value in the result of execution of a COBOL program by an execution unit to the data type of the calling side programming language while coding, and unnecessary conversion processing for using data repeatedly between execution units for the COBOL program.

Embodiment 3

Having described embodiments, embodiments may also be implemented in various different forms other than the aforementioned embodiments.

Language

The program language in Embodiment 1 is given for illustration purpose, and embodiments are not limited thereto. For example, the calling source program may be any program when it may be executed in a mobile terminal. The program to be called may be any program when it may not be executed in the mobile terminal.

Debug Information

Having described examples using debug information according to the aforementioned embodiments, embodiments are not limited thereto. Source code of a COBOL program may be used instead. In this case, an application and the source code are deployed in the information processing server 10 having a COBOL application providing REST services.

Therefore, use of debug information may suppress copy of the source code and may reduce a risk of analysis of operations in a program described in the source code and a risk that vulnerability of the services is read through an improper access, for example. The use of debug information may also reduce constraints on deployments and configurations of an application.

System

The described or illustrated processing procedures control procedures, specific names, and information including data and parameters may be arbitrarily changed unless otherwise indicated. The concrete examples, distributions, and numerical values according to the aforementioned embodiments are given merely for illustration purpose and may be changed arbitrarily. The order of processing steps may be changed properly without departing from consistency.

The components of the illustrated apparatuses are functionally conceptual and may not necessarily be physically configured as illustrated. In other words, specific forms of distributions and integrations of the apparatuses may not be limited to the illustrated ones, for example. All or a part of the apparatuses may be functionally or physically distributed or integrated in arbitrary units in accordance with their loads and usages. All or an arbitrary part of processing functions to be implemented in the apparatuses may be implemented by a CPU and a program analyzed and executed by the CPU or may be implemented as wired logic hardware.

Hardware

Figure 16:
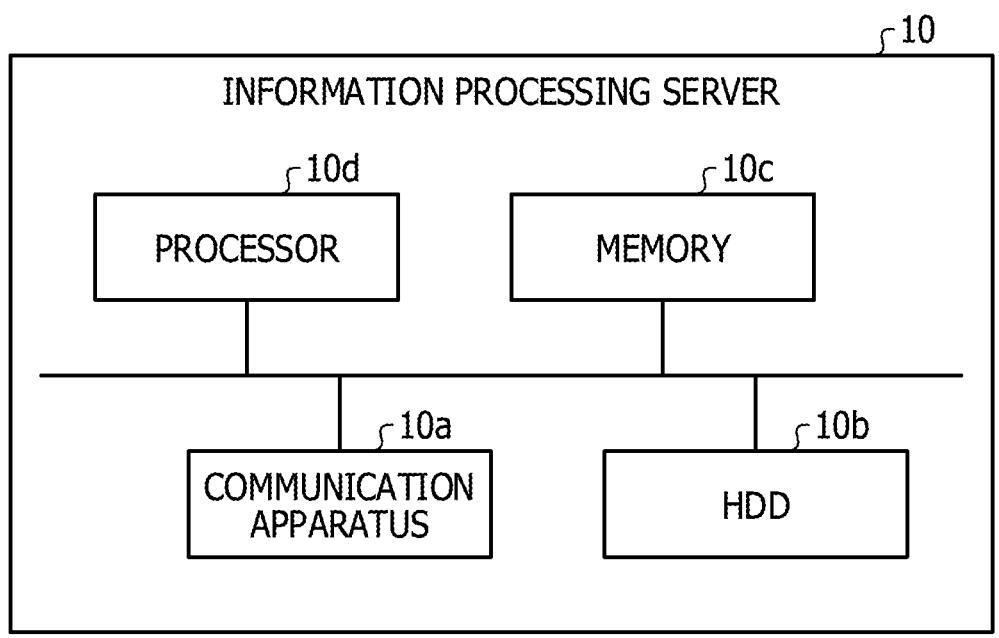
FIG. 16 illustrates an example of a hardware configuration.

FIG. 16 illustrates a hardware configuration example. Referring to FIG. 16, the information processing server 10 has a communication apparatus 10a, an HDD (hard disk drive) 10b, a memory 10c, and a processor 10d. The components illustrated in FIG. 16 are mutually connected via a bus, for example.

The communication apparatus 10a may be a network interface card and is configured to communicate with other servers. The HDD 10b is configured to store a program implementing functions illustrated in FIG. 2 and DBs.

The processor 10d reads and decompresses a program which executes the same processing as the processing units illustrated in FIG. 2 from the HDD 10b to the memory 10c so that processes executing the functions illustrated FIG. 2, for example, may be operated. In other words, the processes execute the same functions as those of the processing units included in the information processing server 10, for example. More specifically, the processor 10d reads from the HDD 10b, for example, a program having the same functions as those of the execution unit processing unit 21, the first converting unit 22, and the second converting unit 23, for example. The processor 10d is configured to execute processes which execute the same processing as that of the execution unit processing unit 21, the first converting unit 22, and the second converting unit 23.

The information processing server 10, as described above, operates as an information processing apparatus which reads and executes a program to execute a data conversion method. The information processing server 10 may further implement the same functions as those of the aforementioned embodiments by reading the program from a recording medium by using a medium reading device and executing the read program. The program according to other embodiments is not limited to be executed by the information processing server 10. For example, embodiments are also applicable to cases where another computer or server may execute the program and where they may execute the program in collaboration.

The program may be distributed over a network such as the Internet. The program may be recorded in a computer-readable recording medium such as a hard disk, a flexible disk (FD), a CD-ROM, an MO (Magneto-Optical disk), and a DVD (Digital Versatile Disc) and may be read from the recording medium to be executed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control method comprising:
   executing a receiving process that includes receiving a designation from a first program, the designation including first indication information, first data symbol information, first data type information, and first data body, the first indication information indicating a second program, the first data symbol information indicating a parameter name of a parameter in the first program, the first data type information indicating a first data type of the parameter in the first program, the second program being one of a plurality of programs;
   automatically executing an identifying process in response to the receiving of the designation from the first program, the identifying process including:
      automatically selecting, in accordance with the received designation from the first program, first configuration information from among plural pieces of configuration information stored in a storage unit, each configuration information including second indication information, second data symbol information, and second data type information, the second indication information indicating any of the plurality of programs, the second data symbol information indicating a parameter name of a parameter in a respective program, the second data type information indicating a second data type of the parameter in the respective program, the automatically selected first configuration information having the second indication information that indicates a program same as the second program indicated by the first indication information of the received designation from the first program and having the second data symbol information that indicates a parameter name of a parameter in the respective program same as the parameter name of the parameter in the first program indicated by the first data symbol information of the received designation from the first program; and
      automatically identifying a target data type corresponding to the first data type of the parameter in the first program of the received designation from the first program by using the second data type information of the automatically selected first configuration information, the identified target data type being the second data type of the parameter in the respective program indicated by the second data type information included in the automatically selected first configuration information; and
   executing a generating process in response to the identified target data type, the generating process including:
      generating second data body adjusted to the second program by converting the first data body included in the received designation from the first program from the first data type of the parameter in the first program to the identified target data type; and
      causing the second program to perform target operation on the generated second data body, the target operation being an operation indicated by at least either the first data symbol information or the second data symbol information.

2. The control method according to claim 1, wherein the automatically selected first configuration information is debug information generated in accordance with compiling the second program.

3. The control method according to claim 1,
wherein the receiving process is configured to receive, from the first program, type information for identifying an access destination for debug information of the second program to be called from the first program, and
wherein the identifying process is configured to associate a data type of the first program with a data type of the second program, by referring to the debug information of the second program in accordance with the type information.

4. The control method according to claim 3, further comprising:
obtaining, from the first program, an argument to the second program of the data type of the first program;
converting the argument from the data type of the first program to the data type of the second program by using the debug information;
notifying the second program of the argument converted to the data type of the second program and obtaining an execution result of the second program;
converting the execution result of the second program from the data type of the second program to the data type of the first program by using the debug information; and
responding to the first program with the execution result of the second program converted from the data type of the second program to the data type of the first program.

5. The control method according to claim 4, further comprising:
notifying the second program of a reference variable for referring to an argument to the second program, the argument being stored in a storage area that is referable by another program, and executing the second program;
obtaining the execution result of the second program from the storage area; and
responding to the first program with the execution result of the second program from the storage area.

6. A control apparatus comprising:
a memory; and
a processor coupled to the memory, the processor being configured to:
execute a receiving process that includes receiving a designation from a first program, the designation including first indication information, first data symbol information, first data type information, and first data body, the first indication information indicating a second program, the first data symbol information indicating a parameter name of a parameter in the first program, the first data type information indicating a first data type of the parameter in the first program, the second program being one of a plurality of programs;
automatically execute an identifying process in response to the receiving of the designation from the first program, the identifying process including:
automatically selecting, in accordance with the received designation from the first program, first configuration information from among plural pieces of configuration information stored in a storage unit, each configuration information including second indication information, second data symbol information, and second data type information, the second indication information indicating any of the plurality of programs, the second data symbol information indicating a parameter name of a parameter in a respective program, the second data type information indicating a second data type of the parameter in the respective program, the automatically selected first configuration information having the second indication information that indicates a program same as the second program indicated by the first indication information of the received designation from the first program and having the second data symbol information that indicates a parameter name of a parameter in the respective program same as the parameter name of the parameter in the first program indicated by the first data symbol information of the received designation from the first program; and
automatically identifying a target data type corresponding to the first data type of the parameter in the first program of the received designation from the first program by using the second data type information of the automatically selected first configuration information, the identified target data type being the second data type of the parameter in the respective program indicated by the second data type information included in the automatically selected first configuration information; and
execute a generating process in response to the identified target data type, the generating process including:
generating second data body adjusted to the second program by converting the first data body included in the received designation from the first program from the first data type of the parameter in the first program to the identified target data type; and
causing the second program to perform target operation on the generated second data body, the target operation being an operation indicated by at least either the first data symbol information or the second data symbol information.

7. The control apparatus according to claim 6,
wherein the automatically selected first configuration information is debug information generated in accordance with compiling the second program.

8. The control apparatus according to claim 6,
wherein the receiving process is configured to receive, from the first program, type information for identifying an access destination for debug information of the second program to be called from the first program, and
wherein the identifying process is configured to associate a data type of the first program with a data type of the second program, by referring to the debug information of the second program in accordance with the type information.

9. The control apparatus according to claim 8, further comprising:
obtaining, from the first program, an argument to the second program of the data type of the first program;
converting the argument from the data type of the first program to the data type of the second program by using the debug information;
notifying the second program of the argument converted to the data type of the second program and obtaining an execution result of the second program;
converting the execution result of the second program from the data type of the second program to the data type of the first program by using the debug information; and responding to the first program with the execution result of the second program converted from the data type of the second program to the data type of the first program.

10. The control apparatus according to claim 9, further comprising:
notifying the second program of a reference variable for referring to an argument to the second program, the argument being stored in a storage area that is referable by another program, and executing the second program;
obtaining the execution result of the second program from the storage area; and
responding to the first program with the execution result of the second program from the storage area.

11. A non-transitory computer-readable storage medium for storing a program which causes a processor to perform processing, the processing comprising:
executing a receiving process that includes receiving a designation from a first program, the designation including first indication information, first data symbol information, first data type information, and first data body, the first indication information indicating a second program, the first data symbol information indicating a parameter name of a parameter in the first program, the first data type information indicating a first data type of the parameter in the first program, the second program being one of a plurality of programs;
automatically executing an identifying process in response to the receiving of the designation from the first program, the identifying process including:
automatically selecting, in accordance with the received designation from the first program, first configuration information from among plural pieces of configuration information stored in a storage unit, each configuration information including second indication information, second data symbol information, and second data type information, the second indication information indicating any of the plurality of programs, the second data symbol information indicating a parameter name of a parameter in a respective program, the second data type information indicating a second data type of the parameter in the respective program, the automatically selected first configuration information having the second indication information that indicates a program same as the second program indicated by the first indication information of the received designation from the first program and having the second data symbol information that indicates a parameter name of a parameter in the respective program same as the parameter name of the parameter in the first program indicated by the first data symbol information of the received designation from the first program; and
automatically identifying a target data type corresponding to the first data type of the parameter in the first program of the received designation from the first program by using the second data type information of the automatically selected first configuration information, the identified target data type being the second data type of the parameter in the respective program indicated by the second data type information included in the automatically selected first configuration information; and
executing a generating process in response to the identified target data type, the generating process including:
generating second data body adjusted to the second program by converting the first data body included in the received designation from the first program from the first data type of the parameter in the first program to the identified target data type; and
causing the second program to perform target operation on the generated second data body, the target operation being an operation indicated by at least either the first data symbol information or the second data symbol information.

12. The non-transitory computer-readable storage medium according to claim 11,
wherein the automatically selected first configuration information is debug information generated in accordance with compiling the second program.

13. The non-transitory computer-readable storage medium according to claim 11,
wherein the receiving process is configured to receive, from the first program, type information for identifying an access destination for debug information of the second program to be called from the first program, and
wherein the identifying process is configured to associate a data type of the first program with a data type of the second program, by referring to the debug information of the second program in accordance with the type information.

14. The non-transitory computer-readable storage medium according to claim 13, further comprising:
obtaining, from the first program, an argument to the second program of the data type of the first program;
converting the argument from the data type of the first program to the data type of the second program by using the debug information;
notifying the second program of the argument converted to the data type of the second program and obtaining an execution result of the second program;
converting the execution result of the second program from the data type of the second program to the data type of the first program by using the debug information; and
responding to the first program with the execution result of the second program converted from the data type of the second program to the data type of the first program.

15. The non-transitory computer-readable storage medium according to claim 14, further comprising:
notifying the second program of a reference variable for referring to an argument to the second program, the argument being stored in a storage area that is referable by another program, and executing the second program;
obtaining the execution result of the second program from the storage area; and
responding to the first program with the execution result of the second program from the storage area.

* * * * *